United States Patent [19]
Bennett

[11] 3,821,887
[45] July 2, 1974

[54] METHOD AND APPARATUS FOR LOCATING PIPE BENDS

[76] Inventor: Robert B. Bennett, 7620 78th St., Rock Island, Ill. 61201

[22] Filed: Jan. 23, 1973

[21] Appl. No.: 326,107

[52] U.S. Cl. .................................. 72/34, 72/369
[51] Int. Cl. ............................................. B21d 7/14
[58] Field of Search ............. 72/31, 32, 33, 34, 369; 33/21 C, 76 R, 174 N; 101/35, 38 R, 39

[56] References Cited
UNITED STATES PATENTS

| | | | |
|---|---|---|---|
| 1,740,091 | 12/1929 | Hessenbruch........................ | 72/306 |
| 2,389,206 | 11/1945 | McKinney et al. ................... | 72/34 |
| 2,549,911 | 4/1951 | Lee........................................ | 33/21 |
| 2,726,450 | 12/1955 | Ware..................................... | 33/21 |
| 3,581,537 | 6/1971 | Lance et al........................... | 72/32 |

*Primary Examiner*—Lowell A. Larson

[57] ABSTRACT

A pipe marking machine has an elongated stand for rotatably supporting a length of straight pipe, a gravity-operated rotation indicator being attached to one end of the pipe for indicating the rotation of the pipe about its axis from a predetermined angular position. A marking device is mounted for sliding along an elongated scale adjacent and parallel to the pipe. To mark the location of a bend along the pipe, the marking device is moved a selected distance along the scale and the pipe is rotated while the marker is in contact with the pipe to place a circumferential mark on the pipe a selected distance from the end of the pipe. The pipe is then rotated a selected number of degrees from the original position as indicated by the rotation indicator, and when the pipe is in its selected angular position, the marker is brought into contact with the pipe and shifted longitudinally of the pipe to place a longitudinal mark intersecting the circumferential mark to provide both a longitudinal and an angular reference point for locating a bend on a pipe prior to bending the pipe in a bending machine.

9 Claims, 9 Drawing Figures

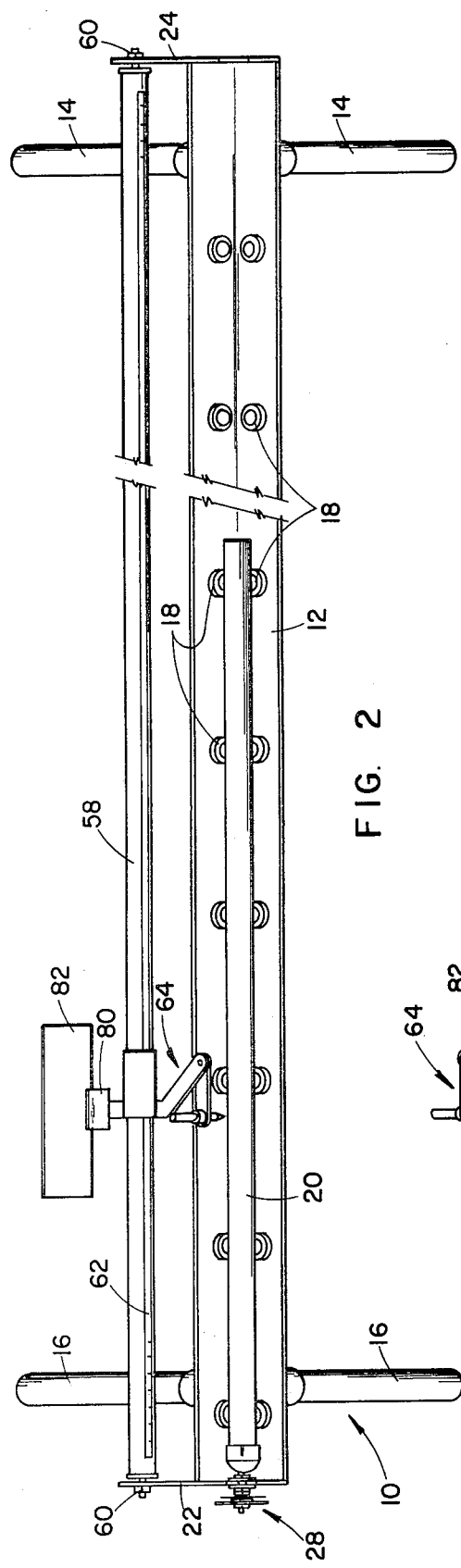
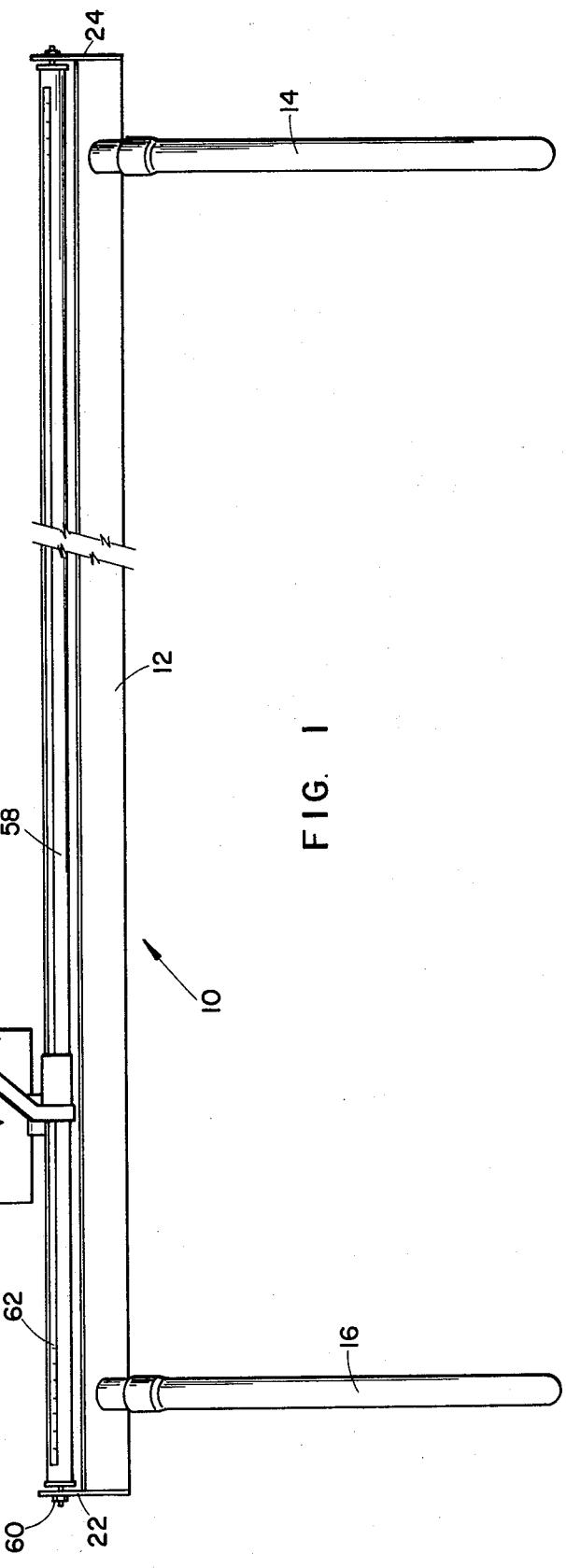
FIG. 1
FIG. 2

PATENTED JUL 2 1974 3,821,887

METHOD AND APPARATUS FOR LOCATING PIPE BENDS

BACKGROUND OF THE INVENTION

This invention relates to a device for marking a location of a bend on a length of pipe prior to bending the pipe in a conventional pipe bending machine.

It is known to provide a machine for bending a pipe with a preselected radius of curvature through a selected number of degrees, such machines having wide application in the muffler replacement industry, wherein exhaust and tail pipes are frequently replaced having relatively complex bends. While it is possible to obtain preformed exhaust and tail pipes, particularly for more popular models of cars, it is impractical to maintain a stock of said pipes for every car model. To reduce the inventory costs of such pipes and the associated storage problem, it has become conventional for muffler shops and the like to purchase lengths of straight pipe and form the pipes as the need arose.

To accomplish the above, data cards are available, which provide the necessary information for custom bending of exhaust and tail pipes for each make and model of car. The data on such cards includes the length of the pipe between the bend and one end of the pipe, the direction of the bend from a preselected angular position about the axis of the pipe in terms of the number of degrees from a base position, and the length of the bend or the number of degrees through which the pipe is to be bent, the above three parameters for each bend determining the configuration of the pipe. As indicated above, pipe bending machines are commercially available for bending a pipe through a selected number of degrees, one such machine being manufactured by Huth Manufacturing Company, said machine being described in U.S. Pat. No. 3,429,157. In such a machine, the depth of bend or the number of degrees through which the pipe is bent at a given location is controlled by a setting on the machine. It is known to mount a gravity-operated angular gauge on one end of the pipe in such machine to locate the pipe at a selected angular position about its axis, which controls the direction of the bend. To bend the pipe in such a machine, the location of each bend along the pipe is determined by manually measuring from the end of the pipe prior to bending the pipe, and the pipe is clamped and unclamped before and after each bend. The proper angular position of the pipe for each bend is established according to a gravity-operated gauge at one end of the pipe, the depth or degree of bend is then set on the machine, and the machine is actuated to bend the pipe.

However, it has been found that the above mentioned is relatively slow, since it is necessary to make a separate measurement of the length at each bend. Also, when the bend is near the end of the pipe to which the angular gauge is attached, a problem is created. On the other hand, a visual problem is created when the gauge is at the end of the pipe away from the end of the pipe that is being bent, since the indicia on the gauge are relatively small and on longer pipes, the gauge is located a considerable distance from the operator. A further problem is created if the operator skips a set of data for a given bend and mistakenly applies the data from the preceding or succeeding bend, which ruins the pipe.

SUMMARY OF THE INVENTION

According to the present invention, an apparatus is provided for marking the longitudinal location of the bends along the pipe and also the angular orientation of the pipe for each bend prior to bending the pipe on the pipe bender. An important advantage of the invention resides in the fact that such a pre-marking of the pipe substantially speeds up the overall bending operation. More specifically, the pre-marking of the pipe eliminates any problem with interference by the gauge on one end of the pipe or any problem with seeing the gauge when locating the pipe bends. Also, it is much simpler and quicker to mark the longitudinal location of bends when the pipe is straight rather than determining the longitudinal location during the actual bending process. Another advantage resides in the fact that the operator is less likely to skip a set of data when marking the pipe in a continuous operation rather than locating each bend during the actual bending operation. If a mark on the pipe is overlooked during the bending of the pipe, the pipe is not ruined, but can merely be reinserted in the machine and corrected by performing the proper bend.

More specifically, according to the invention a pipe marking apparatus is provided for marking the longitudinal location of a bend on a length of pipe and marking an indication of the direction of the bend at substantially the same time.

Still another feature of the invention resides in its relatively simple and inexpensive construction.

Also according to the invention, an improved method is provided for pre-marking a length of straight pipe with the proper longitudinal location of each bend as well as the direction of each bend. Moreover, the depth of each bend in terms of degrees of rotation about the axis of curvature of the bend can be written on the pipe adjacent to the locating marks, so that the operator doing the actual bending process is able to set the bending machine without reference to the data cards.

Another feature of the invention resides in the fact that a mirror image pipe from a standard pipe can easily be marked by simply reversing the face on the angular gauge, such mirror image pipes often being utilized on cars with dual exhaust systems.

BRIEF DESCRIPTION OF THE DRAWINGS

FIG. 1 is a side elevation view of an embodiment of the pipe marking machine.

FIG. 2 is a plan view of the machine shown in FIG. 1 including a length of pipe on the machine.

DESCRIPTION OF THE PREFERRED EMBODIMENT

Figure 3:
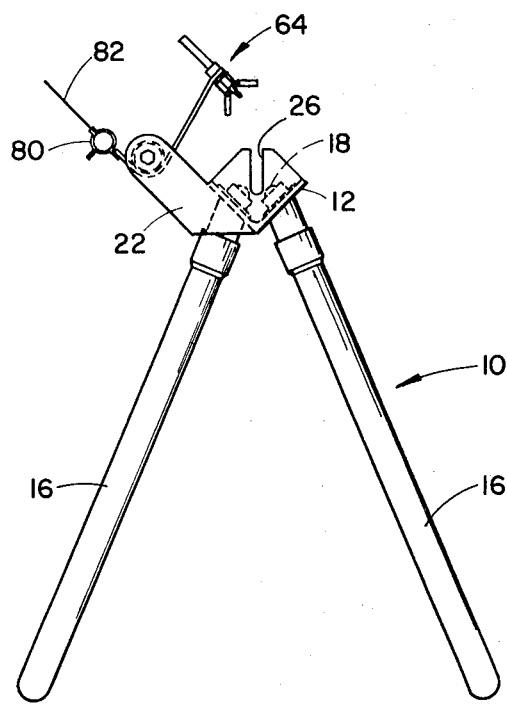
FIG. 3 is an elevation view of one end of the machine.

The invention is embodied in a marking apparatus, which includes an elongated stand 10 having an elongated, horizontal bed or beam 12 with one end supported on a pair of diverging legs 14 and its opposite end supported on a similar pair of diverging legs 16. The bed is preferably made of a length of upwardly open angle iron, so that the bed 12 has a V-shaped cross section and forms an elongated trough. A plurality of ball-type bearings 18 are spaced at regular intervals along the bed 12 in pairs on opposite sides of the bed to rotatably support a length of pipe 20 above and parallel to the bed 12 for rotation about the axis of the pipe 20, the periphery of the pipe 20 riding on the rotatable spherical bearings. A relatively short length of pipe is shown supported on the bearings 18 in FIG. 2 to illustrate the mounting of the pipe on the bed.

A pair of brackets 22 and 24 respectively are secured to and extend upwardly and rearwardly from the opposite ends of the bed 12, and the left end bracket 22 is provided with a vertical slot 26, which extends below the axis of any pipe supported on the bearings 18.

A rotation indicator means, indicated generally by the numeral 28, is mounted on the left end of the pipe 20 and includes a socket 30 having a cylindrical recess 31 adapted to receive the end of the pipe 20. Different sized sockets are provided to tightly receive different sized pipes, and the pipe 20 is inserted in the socket recess 31 so that the end of the pipe seats against a bottom 32 of the socket, the socket being provided with longitudinal slots 34 so that the socket can expand to accommodate slightly different pipe sizes and tightly clamp onto the end of the pipe.

The rotation indicator means includes a threaded shaft 36, which is coaxially threaded into the closed end of the socket 30 and a pair of annular locator plates 38 and 40 are coaxially mounted on the shaft 36 and are spaced a distance that is approximately the same as the thickness of the left end bracket 22 adjacent the slot 26, so that the slot 26 receives the shaft 36 with the opposite locator plates 38 and 40 engaging the opposite sides of the bracket 22. The locator plate 38 is attached to a nut 42 threaded on the shaft, and a locking nut 44 is interposed between the nut 42 and the socket 30. The plate 40 is similarly secured to the shaft by means of a nut 46 threaded on the shaft and locked in position by a lock nut 48. Thus, when the pipe 20 is seated against the bottom 32 of the socket, and the locator plates 38 and 40 engage the opposite sides of the bracket 22, the left end of the pipe is located in a predetermined position.

Figure 5:
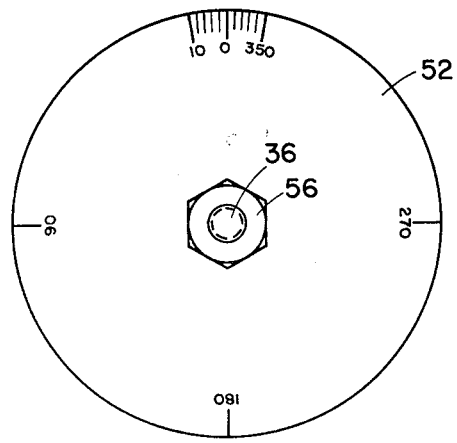
FIG. 5 is an end view of the indicator.
Figure 4:
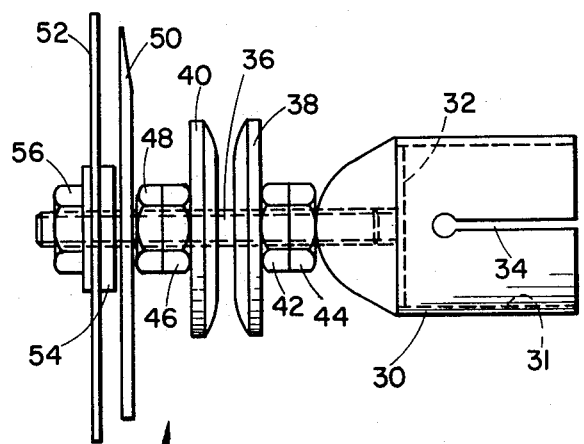
FIG. 4 is an enlarged side elevation view of the gravity-actuated angle indicator, including the socket for attaching the indicator to the end of the pipe.

The rotation indicator means 28 includes a gravity-actuated gauge pointer 50 rotatably mounted on the shaft 36 and maintained a vertical position by gravity. A dial plate 52 is mounted on the shaft 36 adjacent the pointer 50 and is marked off in degrees. As indicated in FIG. 5, both sides of the dial plate are marked. The dial plate 52 is rigidly clamped to the shaft between a backing member 54 and a lock nut 56 threaded on the shaft 36.

An elongated tubular support 58 is attached to and extends between the end brackets 22 and 24 parallel and to the rear of the bed 12, the opposite ends of the support 58 being secured to the brackets by means of fasteners 60. A scale 62 is disposed on and extends along the support 58. Preferably, the zero point on the scale lies in a plane normal to the axis of the pipe 20 at the end of the pipe when the pipe is seated against the recess bottom 32 in the socket 30, or in other words, the beginning of the scale is transversely aligned with the bottom of the socket.

A marker means indicated generally by the numeral 64 is mounted for sliding movement along the support 58 and includes a sleeve-like carriage 66 slidably and coaxially mounted on the tubular support 58 and having a tangentially extending arm 68 extending toward the bed 12. A second arm 70 generally parallel to and above the pipe 20 is attached the outer end of the arm 68 by means of a releasable fastener 71, and a marking element holder 72 is mounted on the end of the arm 70. A marking element, here a conventional felt tip pen, is mounted in the holder 72 with the tip of the pen projecting downwardly from the holder. A pair of diverging guides 76 extend downwardly from the holder 72 on opposite sides of the marking element tip and engage the pipe 20 when the marking element tip lightly engages the periphery of the pipe. The exact position of the marking element can be adjusted by loosening the fastener 71 and adjusting the arm 70 relative to the arm 68.

As is apparent, the carriage 66 can be shifted along the support 58, and the edge of the carriage is aligned with the marking element 74. Thus, when the edge of the carriage is aligned with the zero mark on the scale 62, the tip of the marking element 74 is aligned with the end of the pipe, and if the carriage were shifted so that its indicia were aligned with the 1 foot mark, for example, on the scale 62, the marking element tip would be located 1 foot from the end of the pipe. As is apparent, the carriage and the marking element 74 supported thereon can be rocked about the support 58 to bring the tip of the marking element 74 into contact with the periphery of the pipe 20 to place a mark thereon, and if the pipe 20 is rotated with the marking element in contact therewith, a circumferential mark is applied to the pipe, while a longitudinal mark can be applied by moving the carriage 66 with the marking element in contact with the pipe.

An upwardly and rearwardly inclined arm 78 also extends tangentially from the carriage 66 and carries a clamp 80, which is adapted to hold a data card 82, so that the necessary information for marking the pipe is readily visible to the operator.

In operation, the operator selects the proper program or data card 82 and inserts it into the clamp 80 and then selects the desired size of tubing. The selected pipe or tubing is then placed on the bed 12 on the bearings 18 and shifted to the left into the socket recess 31 until it seats against the socket bottom 32. The carriage 66 is then shifted along the support for a distance that corresponds to the length between the end of the pipe and the first bend, at which time the marking element 74 is brought into contact with the periphery of the pipe and a circumferential mark is placed on the pipe by rolling the pipe on the bearings 18. The pipe is then rolled to the left or right until the gauge pointer 50 points to the number of degrees on the dial plate 52 indicated on the data card, at which time the carriage is moved to the right to place a longitudinal mark on the pipe at the selected angular position. With a separate marking pen, the depth of the bend or the number of degrees through which the pipe is to be bent at the marked location can be transcribed from the data card to the pipe adjacent the length and direction of bend marks already placed thereon.

Figures 6, 7, 8, 9:
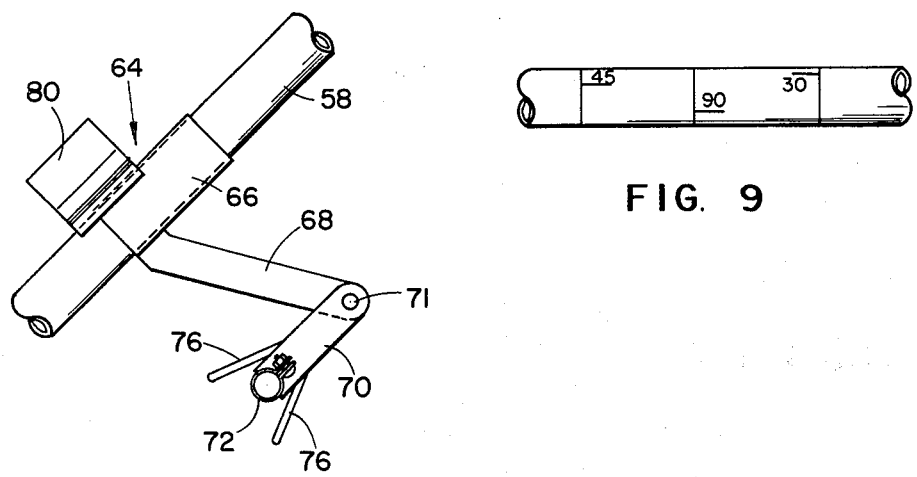
FIG. 6 is an enlarged end view of the upper portion of the machine showing the marker device in greater detail.
FIG. 7 is a side view of the marking device projecting from FIG. 6.
FIG. 8 is a plan view of the marking device projected from FIG. 7.
FIG. 9 is a view of a section of marked pipe.

The marking element 74 is then raised from the pipe and the carriage 66 is moved along the support until it reaches the longitudinal location on the scale that corresponds to the length of the pipe at the second bend, which data is obtained from the data card 82. A second circumferential mark is then placed on the pipe as previously described, and the pipe is rotated until the gauge pointer 50 indicates the position on the dial plate 52 that corresponds to the number of degrees for the direction of the second bend from the data card, at which time the carriage can be shifted with the marking element 74 in contact with the pipe to place a second longitudinal mark on the pipe. Again, the depth of bend can be marked on the pipe adjacent to the longitudinal and circumferential marks. If a forward bend is indicated on the data card, the longitudinal mark should be placed to the right of the circumferential mark and the depth of bend should be recorded above the line as indicated for the first two bends in FIG. 9. If a reverse bend is indicated on the program card, the longitudinal mark should extend to the left of the circumferential mark and the depth of bend should be recorded below the longitudinal line as indicated for the third, or right-hand bend on the pipe shown in FIG. 9.

The above steps are repeated until all the bends are located on the pipe. The overall length of the pipe can also be determined from the data card, and the carriage 66 shifted to a position that corresponds to the overall length of the pipe, at which time a circumferential mark can be placed on the pipe by rotating the pipe to indicate the cutoff line. The tubing can then be removed from the marking machine, and quickly formed on the pipe bending machine, without further measurements or reference to the data cards.

Preferably, the dial plate 52 can be provided with angular indication in opposite directions from the zero point on opposite sides of the plate, so that by simply reversing the dial plate 52 on the shaft 36, the direction of the bends can be reversed. This will provide a mirror image of the normal configuration of the pipe, using the same data as used to make the normal bends.

As is apparent, the above-described machine for pre-marking the pipes is relatively simple and inexpensive to manufacture. As is also apparent, the method of using the machine is quite simple and substantially speeds up the overall pipe bending operation.

I claim:

1. An apparatus for marking the location of bends on a length of pipe prior to bending the pipe in a pipe bending machine, said apparatus comprising: an elongated stand including an elongated horizontal bed having bearing means for rotatably supporting a length of straight pipe for rotation about its axis; a rotation indicator means operatively connected to the pipe for indicating the degrees of rotation of the pipe from a predetermined angular position; an elongated support mounted on the stand and disposed parallel and adjacent to the length of pipe and having an elongated scale associated therewith; a marker means shiftably mounted on the support for longitudinal movement thereon and including a marking element swingable into contact with the pipe to scribe a mark thereon, the marker means being shifted to selected longitudinal positions along the support as measured by the scale and the pipe rotated to different selected angular positions as measured by the indicator means, and the marking element being shifted into contact with the pipe in the selected positions of the pipe and marking means to mark selected angular and longitudinal location on the pipe.

2. The invention defined in claim 1 wherein the rotation indicator means includes a dial plate coaxially attached to one end of the pipe and a gravity-operated indicator associated with the dial plate to indicate the angular position of the pipe.

3. The invention defined in claim 2 wherein the rotation indicator means includes a socket which receives the end of the pipe, means for connecting the dial plate to the socket, and bracket means connecting the socket to the beam to position the end of the pipe in a predetermined longitudinal position.

4. The invention defined in claim 3 wherein the scale is disposed on the elongated support and has a zero indication aligned with a predetermined location on the marker means when the marking element is aligned with the end of the pipe mounted in the socket.

5. The invention defined in claim 1 and including clamp means mounted on the marker means for releasably holding a data card.

6. A method of locating bends on a length of pipe prior to bending the pipe in a bending machine comprising: placing a length of straight pipe on an apparatus adapted to rotatably support the pipe for rotation about the pipe axis and having a marking device shiftable parallel to the pipe and engageable therewith; providing an elongated scale adjacent and parallel to the pipe with one end aligned with one end of the pipe; mounting an angular gauge means on the pipe for measuring the rotation of the pipe from a preselected reference position; moving the marking device along the support apparatus a given distance from said one and as measured by the scale according to the desired distance between the end of the pipe and the first bend; rotating the pipe a given number of degrees from the reference position a measured distance by the gauge means according to the desired direction of bend from the reference position; bringing the marking device into engagement with the pipe when the pipe is in the selected angular position and the marking device is in the selected longitudinal position to mark the longitudinal location and direction of bend of the first bend; and longitudinally shifting the marking device to a selected position, rotating the pipe to a selected angular position and placing a mark on the pipe at the selected angular and longitudinal position for each successive pipe bend.

7. The invention defined in claim 6 wherein each mark includes a circumferentially extending portion, formed by rocking the pipe with the marking device in contact therewith at the selected longitudinal position, and a longitudinal portion formed by shifting the marking device longitudinally along the pipe when the pipe is in the selected angular position.

8. The invention defined in claim 7 and including the added step of writing the number of degrees through which the pipe is to be bent adjacent each mark.

9. The invention defined in claim 7 wherein the marking device is shifted longitudinally from the circumferential mark in one direction when the pipe is to be bent in a forward direction and is shifted longitudinally from the circumferential mark in the opposite direction when the pipe is to be bent in a reverse direction.

* * * * *